US012797914B2

(12) United States Patent
Kim et al.

(10) Patent No.: US 12,797,914 B2
(45) Date of Patent: Nov. 17, 2026

(54) SUBSTRATE TREATMENT APPARATUS AND SUBSTRATE TREATMENT METHOD

(71) Applicant: SEMES CO., LTD., Cheonan-si (KR)

(72) Inventors: Soon Hyun Kim, Pyeongtaek-si (KR); Kyung Min Kim, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 45 days.

(21) Appl. No.: 18/395,574

(22) Filed: Dec. 24, 2023

(65) Prior Publication Data

US 2024/0216958 A1 Jul. 4, 2024

(30) Foreign Application Priority Data

Dec. 28, 2022 (KR) ........................ 10-2022-0187371

(51) Int. Cl.
*B08B 3/02* (2006.01)
*B08B 3/08* (2006.01)

(52) U.S. Cl.
CPC ................ *B08B 3/024* (2013.01); *B08B 3/08* (2013.01); *B08B 2203/02* (2013.01)

(58) Field of Classification Search
CPC ....... B08B 3/024; B08B 3/08; B08B 2203/02; B08B 3/022; B08B 13/00; H01L 21/67023; H01L 21/02057; H01L 21/67051; H01L 21/67253; B05B 12/02; B05B 12/126; B05B 13/04; B05B 15/68
See application file for complete search history.

(56) References Cited

U.S. PATENT DOCUMENTS

| | | | | |
|---|---|---|---|---|
| 10,478,867 | B2 | 11/2019 | Hara et al. | |
| 2004/0002784 | A1* | 1/2004 | Yoshida .............. | H01L 21/6715 700/108 |
| 2014/0000659 | A1* | 1/2014 | Lee .................. | H01L 21/67075 134/99.1 |

FOREIGN PATENT DOCUMENTS

| | | |
|---|---|---|
| JP | 2016-111053 | 6/2016 |
| JP | 2021-81052 | 5/2021 |
| KR | 10-2019-0133364 | 12/2019 |
| KR | 10-2020-0119312 | 10/2020 |
| WO | 2019-159742 | 8/2019 |

OTHER PUBLICATIONS

Machine translation of WO 2019/159742 (Year: 2019).*

* cited by examiner

*Primary Examiner* — Erin F Bergner

(57) ABSTRACT

Proposed are a substrate treatment apparatus and a substrate treatment method, and a technology capable of reducing a nozzle driving deviation between facilities by feedback a repetitive operation of a nozzle driving cylinder of the substrate treatment apparatus and by correcting an air input flow rate of the nozzle driving cylinder according to an error in the operation of the nozzle driving cylinder is provided.

13 Claims, 12 Drawing Sheets

Fug. 2

SUBSTRATE TREATMENT APPARATUS AND SUBSTRATE TREATMENT METHOD

CROSS REFERENCE TO RELATED APPLICATION

The present application claims priority to Korean Patent Application No. 10-2022-0187371, filed Dec. 28, 2022, the entire contents of which are herein incorporated by reference.

BACKGROUND OF THE INVENTION

Field of the Invention

The present disclosure relates to a substrate treatment apparatus and a substrate treatment method. More particularly, the present disclosure relates to a technology capable of reducing a nozzle driving deviation between facilities by feedback a repetitive operation of a nozzle driving cylinder of a substrate treatment apparatus and by correcting an air input flow rate of the nozzle driving cylinder according to an error in the operation of the nozzle driving cylinder.

Description of the Related Art

Generally, various processes, such as a photoresist coating process, a developing process, an etching process, an ashing process, and so on, are performed in a treatment process of a glass substrate or a wafer during a process of manufacturing a flat panel display device or a semiconductor manufacturing process.

In each process, in order to remove various contaminants attached to the substrate, a wet cleaning process using a chemical solution or deionized water and a drying process for drying the chemical solution or the deionized water remaining on a surface of the substrate are performed.

In the wet cleaning process, a chemical solution or deionized water is discharged to the substrate through a nozzle, and various contaminants on the substrate are removed. A nozzle driving unit includes a cylinder, and may move the nozzle according to driving of a low speed cylinder.

The cylinder of the nozzle driving unit may move the nozzle and may adjust a position of the nozzle by adjusting an air supply and an air discharge. When such a cylinder of the nozzle driving unit is operated for a long period of time, an eccentric load and a decrease in lubrication occur, so that an operation time from an initial driving position to a completed driving position may be changed. As a result, there is a problem that a movement position and a movement time of the nozzle cannot be adjusted uniformly. In addition, due to this problem, a problem in which a UPH is reduced occurs since a process time is delayed.

SUMMARY OF THE INVENTION

Accordingly, the present disclosure has been made keeping in mind the above problems occurring in the related art, and an objective of the present disclosure is to provide a technology capable of reducing a nozzle driving deviation between facilities by feedback an operation time of a nozzle driving cylinder of a substrate treatment apparatus and by correcting an air input flow rate of the nozzle driving cylinder.

Particularly, the present disclosure is provided so as to solve a problem that a movement time and a movement position of the nozzle are not capable of being adjusted uniformly due to occurrence of an eccentric load and a decrease in lubrication according to an operation of a cylinder of a nozzle driving unit for a long period of time so that an operation time from an initial driving position to a completed driving position of the nozzle driving cylinder.

Furthermore, the present disclosure is provided so as to solve a problem that a UPH is reduced due to the problem of the nozzle driving unit causing delays in process time.

The objectives of the present disclosure are not limited thereto, and other objectives and other advantages of the present disclosure will be understood from the following description.

According to an embodiment of the present disclosure, there is provided a substrate treatment apparatus including: a nozzle configured to discharge a chemical solution to a substrate; a chemical solution dispenser configured to supply the chemical solution to the nozzle while supporting the nozzle; and a nozzle driving unit including a nozzle driving cylinder configured to move the nozzle, the nozzle driving unit being configured to correct an operation of the nozzle driving cylinder by feedback an operation time of the nozzle driving cylinder.

In an embodiment, the nozzle driving unit may include: the nozzle driving cylinder configured to move the nozzle; a control valve configured to adjust air pressure for operating the nozzle driving cylinder; an operation measurement sensor configured to measure the operation of the nozzle driving cylinder; an air supply means configured to provide air to the control valve; and a control unit configured to feedback an operation time of the nozzle driving cylinder and to control an operation of the control valve, thereby correcting the operation of the nozzle driving cylinder to a reference time range.

Furthermore, the control valve may include: an air pressure valve configured to control an air input and an air discharge of the nozzle driving cylinder; and a proportional control valve configured to adjust an air flow rate input to the nozzle driving cylinder.

Furthermore, the proportional control valve may be disposed at a middle end between the nozzle driving cylinder and the air pressure valve, and may be configured to adjust the air flow rate input from the air pressure valve to the nozzle driving cylinder.

As an example, the control unit may be configured to correct the operation of the nozzle driving cylinder to the reference time range by controlling the air flow rate through the proportional control valve of the control valve.

In an embodiment, the control unit may be configured to determine an error range by comparing the measured operation time of the nozzle driving cylinder with the reference time range, and may be configured to correct the operation of the nozzle driving cylinder to the reference time range on the basis of the error range by controlling the air flow rate input to the nozzle driving cylinder through the proportional control valve of the control valve.

As an example, the operation measurement sensor may be configured to measure a completion of the operation of the nozzle driving cylinder, and the control unit may be configured to identify the operation time of the nozzle driving cylinder on the basis of an input time of an operation signal transmitted to the control valve for the operation of the nozzle driving cylinder and on the basis of a completion time of the operation of the nozzle driving cylinder.

As an example, the control unit may include: an operation time determination unit configured to determine the operation time of the nozzle driving cylinder; an operation error determination unit configured to determine an operation time error of the nozzle driving cylinder on the basis of the reference time range; an operation correction unit configured to set a correction value for the operation time error of the nozzle driving cylinder; and an operation control unit configured to control the operation of the nozzle driving cylinder, the operation control unit being configured to correct the operation of the nozzle driving cylinder to the reference time range on the basis of the correction value.

Furthermore, the chemical solution dispenser may include: a nozzle arm supporting the nozzle by having a distal end thereof connected to the nozzle; a shaft supporting the nozzle arm by being connected to the nozzle arm; and a chemical solution supply line disposed inside the nozzle arm and inside the shaft, the chemical solution supply line being configured to supply the chemical solution to the nozzle.

Here, the nozzle driving cylinder of the nozzle driving unit may be configured to change a position of the nozzle by moving the shaft.

As an example, the nozzle driving cylinder may include a rotation driving cylinder that is configured to rotate the shaft, the control valve may include: a first air pressure valve configured to control an air input and an air discharge of the rotation driving cylinder; and a first proportional control valve configured to adjust an air flow rate input to the rotation driving cylinder, the operation measurement sensor may include a first operation measurement sensor configured to measure an operation of the rotation driving cylinder, and the control unit may be configured to feedback an operation time of the rotation driving cylinder and to control an operation of the first proportional control valve, thereby correcting the operation of the rotation driving cylinder to the reference time range.

As an example, the nozzle driving cylinder may include a lift driving cylinder that is configured to lift the shaft, the control valve may include: a second air pressure valve configured to control an air input and an air discharge of the lift driving cylinder; and a second proportional control valve configured to adjust an air flow rate input to the lift driving cylinder, the operation measurement sensor may include a second operation measurement sensor configured to measure an operation of the lift driving cylinder, and the control unit may be configured to feedback an operation time of the lift driving cylinder and to control an operation of the second proportional control valve, thereby correcting the operation of the lift driving cylinder to the reference time range.

Furthermore, the substrate treatment apparatus may further include: a chamber providing a substrate treatment space; and a substrate support unit disposed at a lower portion of the substrate treatment space and configured to support the substrate.

In addition, according to an embodiment of the present disclosure, there is provided a substrate treatment method including: an operation time measurement process in which an operation time of a nozzle driving cylinder is identified by measuring an operation of the nozzle driving cylinder; an operation error determination process in which an operation time error of the nozzle driving cylinder is determined by comparing the operation time of the identified nozzle driving cylinder with a reference time range; and an operation correction process in which an error range of the operation of the nozzle driving cylinder is determined and then the operation of the nozzle driving cylinder is corrected to the reference time range by controlling an operation of a control valve on the basis of the error range.

As an example, in the operation time measurement process, a control unit may identify the operation time of the nozzle driving cylinder on the basis of an input time of an operation signal transmitted to the control valve for the operation of the nozzle driving cylinder and on the basis of an operation completion time of the nozzle driving cylinder measured through an operation measurement sensor.

In an embodiment, in the operation error determination process, the reference time range may be set in advance on the basis of the operation of the nozzle driving cylinder from an initial position of a nozzle to a target position of the nozzle according to a corresponding process condition.

As an example, the operation correction process may include: a correction value determination process in which a correction value of an air input flow rate supplied to the nozzle driving cylinder is determined on the basis of the operation time error of the nozzle driving cylinder; and a setting value correction process in which an air input flow rate setting value for the nozzle driving cylinder is corrected on the basis of the correction value.

Furthermore, the operation correction process may further include an operation signal setting process in which an operation signal of a proportional control valve is set on the basis of a corrected air input flow rate setting value for the nozzle driving cylinder.

Furthermore, the substrate treatment method may further include a nozzle movement process in which a nozzle is moved by operating the nozzle driving cylinder according to the reference time range by adjusting the operation of the nozzle driving cylinder on the basis of a corrected air input flow rate setting value.

In an embodiment, according to an embodiment of the present disclosure, there is provided a substrate treatment apparatus including: a substrate support unit supporting a substrate; a nozzle configured to discharge a chemical solution to the substrate; a dispenser including a nozzle arm that supports the nozzle by having a distal end thereof connected to the nozzle, a shaft supporting the nozzle arm by being connected to the nozzle arm, and a chemical solution supply line which is disposed inside the nozzle arm and inside the shaft and which is configured to supply the chemical solution to the nozzle; and a nozzle driving unit including a nozzle driving cylinder that is configured to change a position of the nozzle by moving the shaft, a control valve provided with an air pressure valve configured to control an air input and an air discharge of the nozzle driving cylinder and with a proportional control valve configured to adjust an air flow rate input to the nozzle driving cylinder, an operation measurement sensor configured to measure an operation of the nozzle driving cylinder, an air supply means configured to supply air to the control valve, and a control unit which is configured to feedback an operation time of the nozzle driving cylinder and to control an operation of the control valve and which is configured to correct the operation of the nozzle driving cylinder to a reference time range by controlling the air flow rate through the proportional control valve.

According to the present disclosure, a deviation of a nozzle movement between facilities may be reduced by correcting an air input flow rate of the nozzle driving cylinder on the basis of an operation time of the nozzle driving cylinder by feedback a repetitive operation of the nozzle driving cylinder.

Particularly, an operation time of the rotation driving cylinder and an operation time of the vertical driving cylinder of the nozzle driving unit are maintained to a predetermined level, so that the accuracy of a movement speed and a movement position of the nozzle may be increased.

Furthermore, a problem that the movement time and the movement position of the nozzle are not capable of being adjusted uniformly due to occurrence of the eccentric load and the decrease in lubrication according to the operation of the cylinder of the nozzle driving cylinder for a long period of time so that the operation time from the initial driving position to the completed driving position of the nozzle driving cylinder may be solved.

The effects of the present disclosure are not limited to those mentioned above, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings, but the present disclosure is not limited or restricted to the embodiments.

In order to explain the present disclosure, the operational advantages of the present disclosure, and the objectives achieved by the practice of the present disclosure, the embodiments of the present disclosure are exemplified below and will be described with reference thereto.

First, the terms used in this application are only used to describe specific embodiments, and are not intended to limit the present disclosure, and a singular expression may include a plural expression unless the context clearly indicates otherwise. In addition, it should be understood that in the present disclosure, terms such as “comprise” or “have” are intended to designate that a feature, number, step, operation, component, part, or combination thereof described in the specification exists, and do not preclude the possibility of addition or existence of one or more other features or numbers, steps, operations, components, parts, or combinations thereof.

In describing the present disclosure, when it is determined that a detailed description of a related known configuration or function may obscure the gist of the present disclosure, the detailed description thereof will be omitted.

In the present disclosure, a technology capable of reducing a nozzle driving deviation between facilities by feedback a repetitive operation of a nozzle driving cylinder of a substrate treatment apparatus and by correcting an air input flow rate of the nozzle driving cylinder according to an error in the operation of the nozzle driving cylinder is provided.

Figure 1:
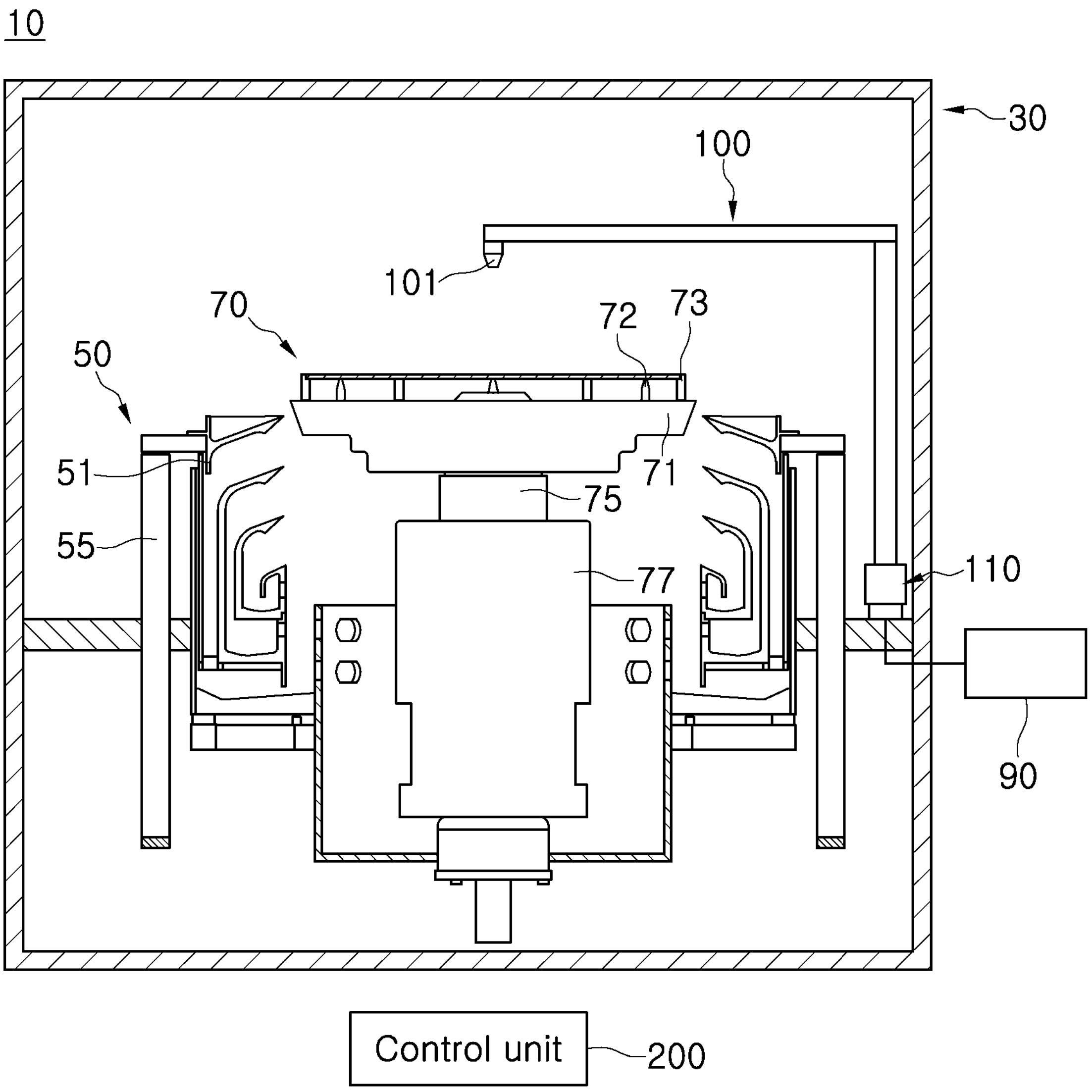
FIG. 1 is a view illustrating an embodiment of a substrate treatment apparatus according to the present disclosure.
Figure 2:
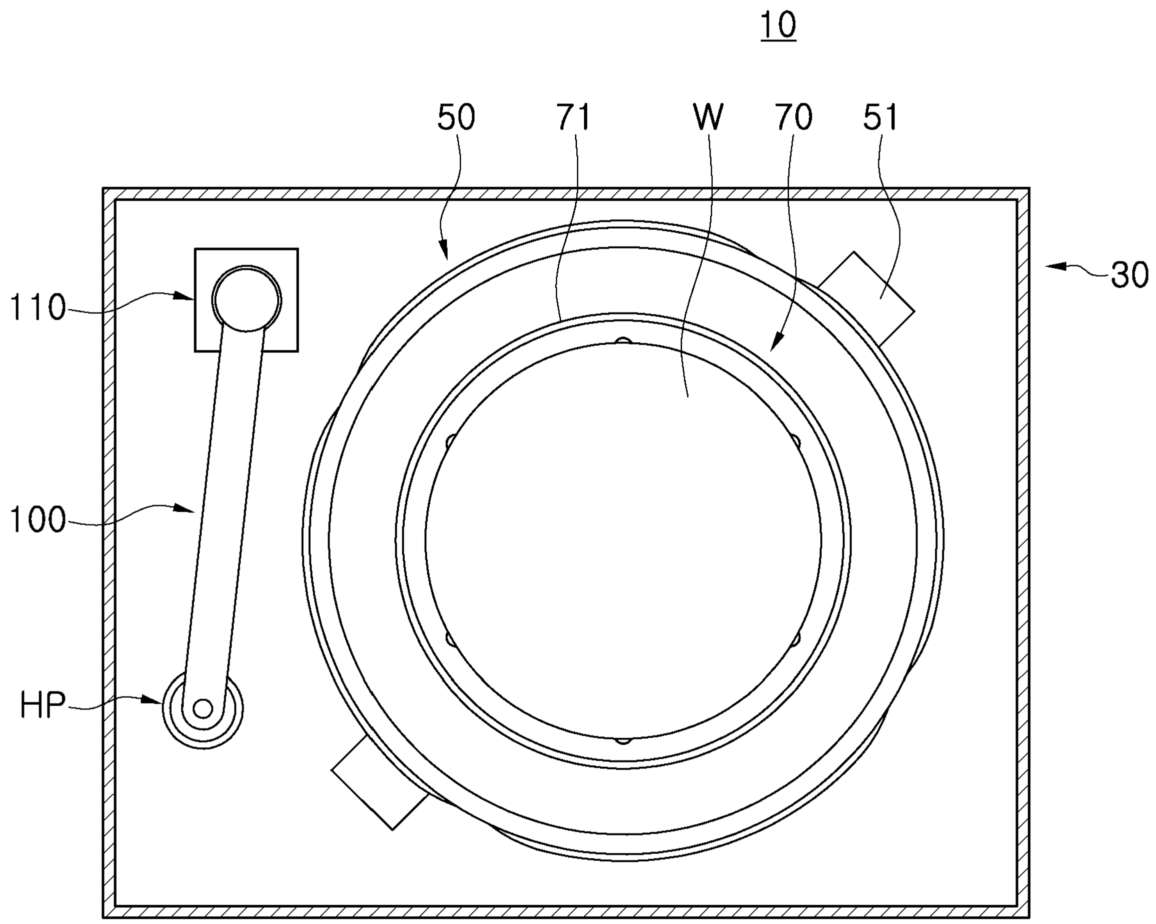
FIG. 2 is a view illustrating an embodiment of the substrate treatment apparatus according to the present disclosure when viewed from above.
Figure 3:
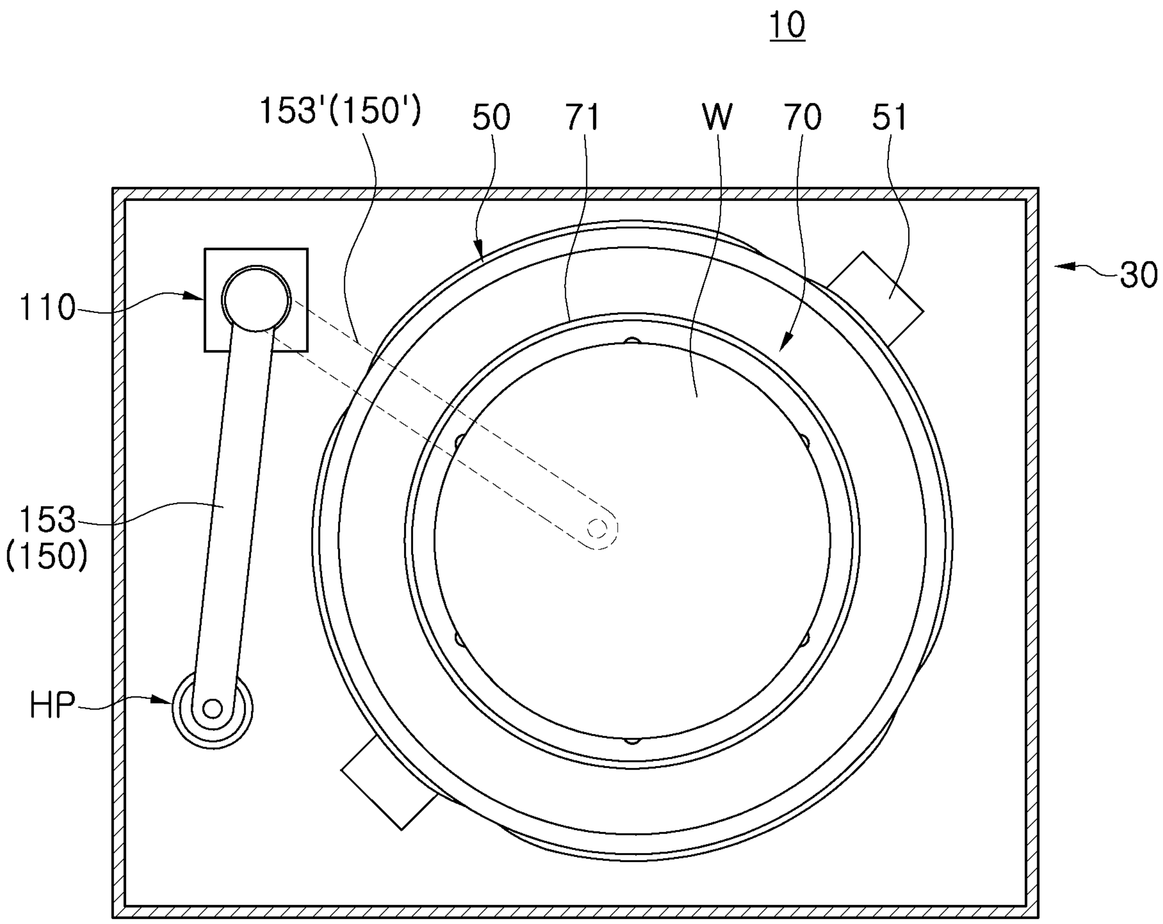
FIG. 3 is a view illustrating an example of an operation of a chemical solution injection means in the substrate treatment apparatus according to the present disclosure.
Figure 4:
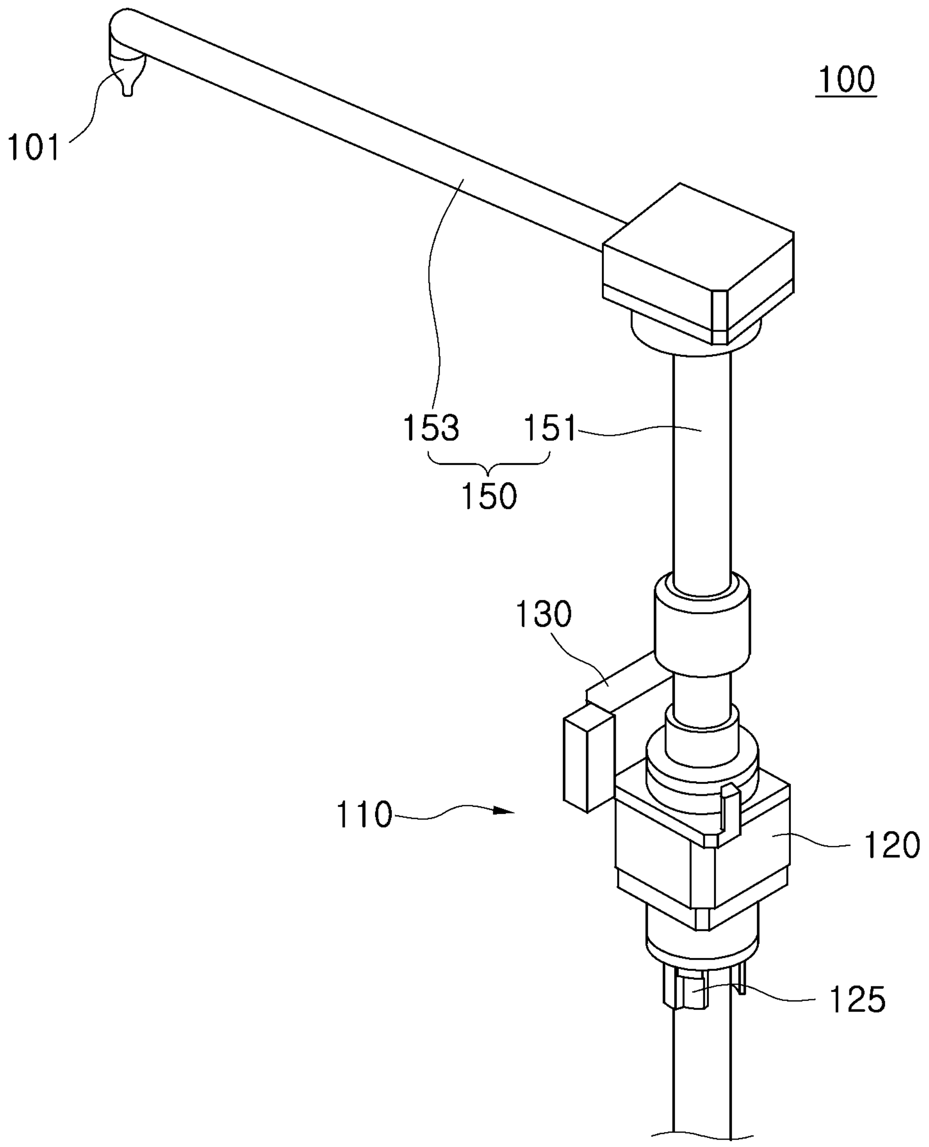
FIG. 4 is a view illustrating an embodiment of the chemical solution injection means of the substrate treatment apparatus according to the present disclosure.
Figure 5:
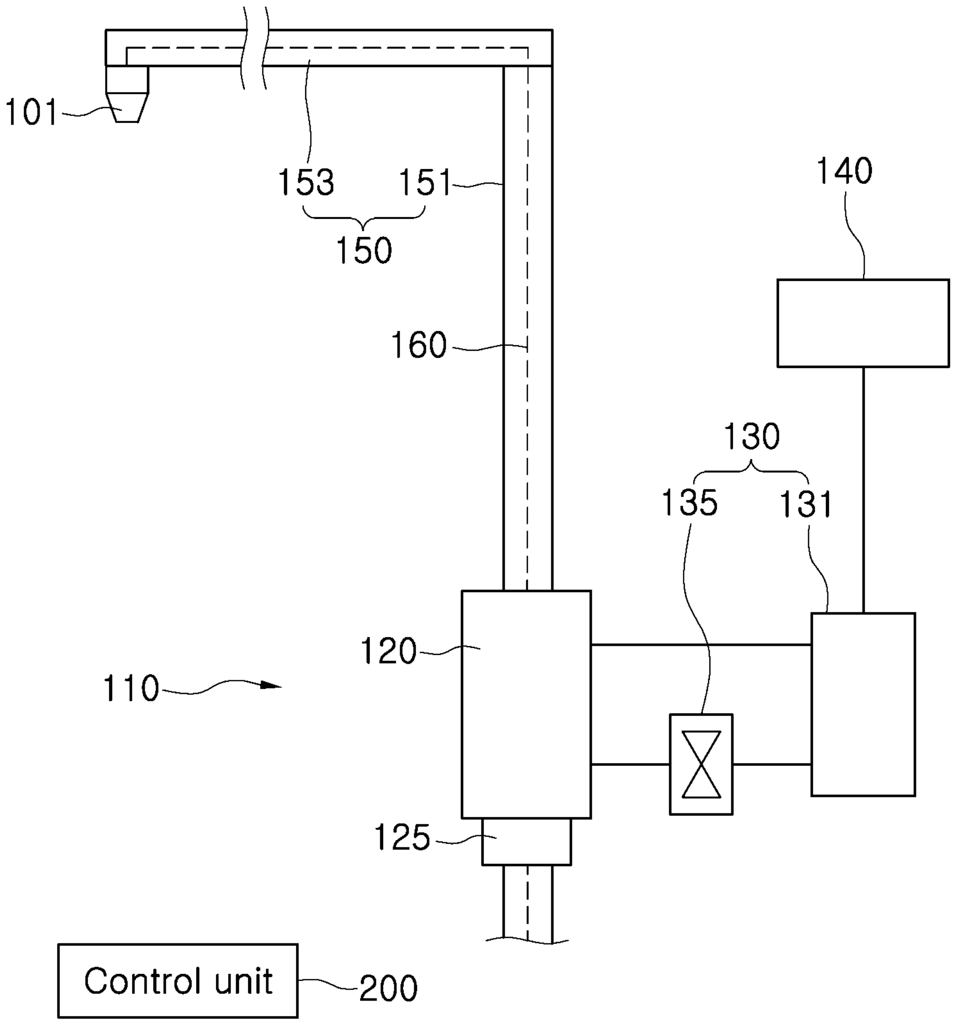
FIG. 5 is a view illustrating a configuration of an embodiment of the chemical solution injection means of the substrate treatment apparatus according to the present disclosure.
Figure 6:
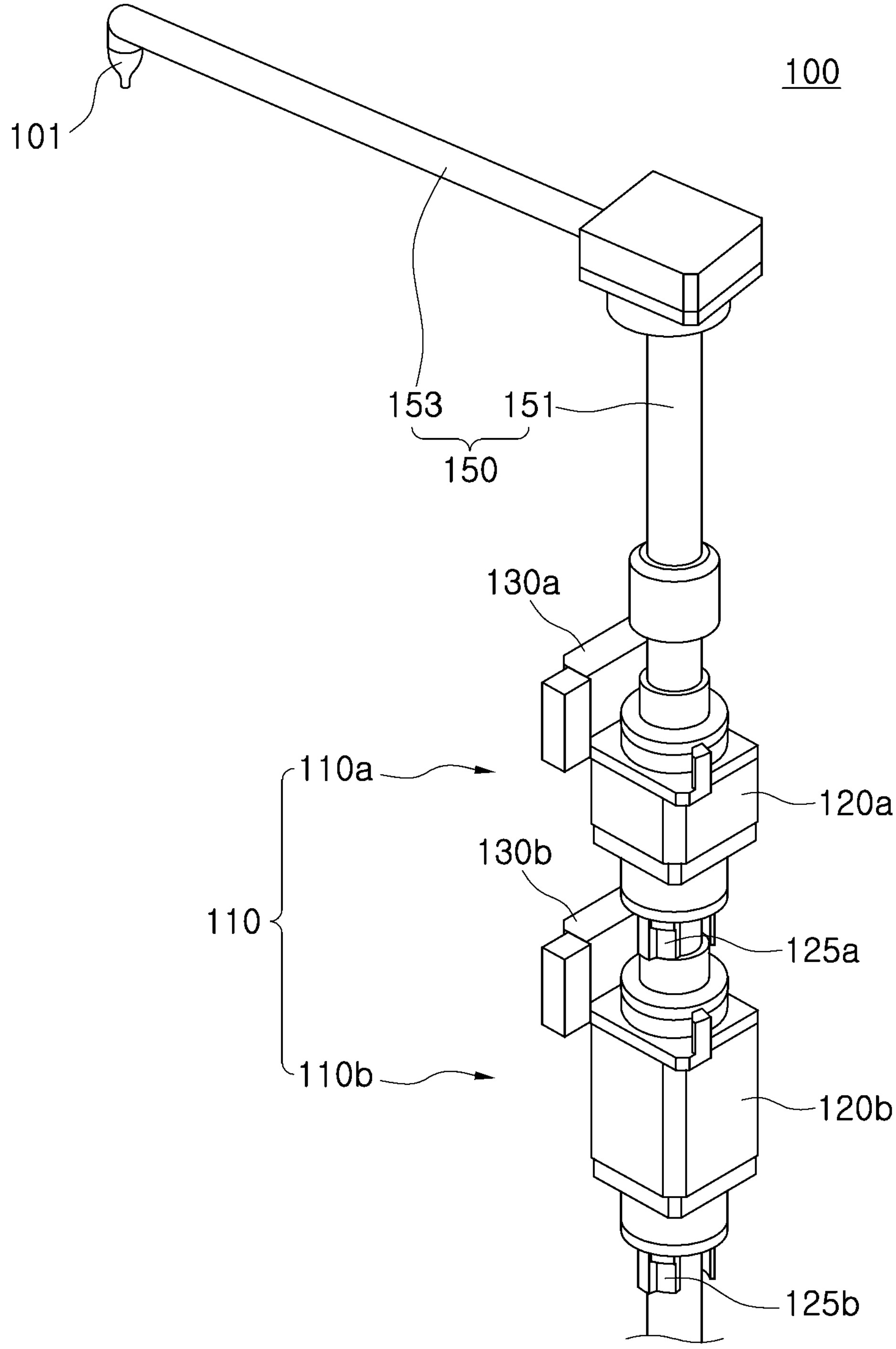
FIG. 6 is a view illustrating a configuration of an embodiment of a control unit of a nozzle driving unit in the present disclosure.

FIG. 1 is a view illustrating an embodiment of the substrate treatment apparatus of the present disclosure, FIG. 2 is a view illustrating an embodiment of the substrate treatment apparatus of the present disclosure when viewed from above, FIG. 3 is a view illustrating an example of an operation of a chemical solution injection means in the substrate treatment apparatus according to the present disclosure, FIG. 4 is a view illustrating an embodiment of the chemical solution injection means of the substrate treatment apparatus according to the present disclosure, and FIG. 6 is a view illustrating a configuration of an example of the chemical solution injection means of the substrate treatment apparatus according to the present disclosure.

Referring to FIG. 1 to FIG. 6, a substrate treatment apparatus 10 includes a chamber 30, a recovery container 50, a substrate support unit 70, a chemical solution injection means 100, a chemical solution supply means 90, a control unit 200, and so on.

The chamber 30 may provide a treatment space which is sealed and which is for substrate treatment.

The substrate support unit 70 may be disposed in the treatment space, and may support a substrate W.

The substrate support unit 70 may include a spin head 71, a rotary shaft 75, a driving unit 77, and so on.

The rotary shaft 75 connected to the spin head 71 is capable of being rotated by the driving unit 77, so that the substrate W mounted on the spin head 71 is capable of being rotated. A support member mounted such that the substrate W is supported in a state in which the substrate W is spaced upward may be provided in the spin head 71. The support member may include a plurality of chucking pins 73 mounted such that the chucking pins 73 protrude and are positioned on an upper edge portion of the spin head 71 so as to be spaced apart from each other by a predetermined distance, and may include a plurality of support pins 72 mounted such that the support pins 72 protrude inside each chucking pin 73. The rotary shaft 75 is connected to the spin head 71, has a hollow shaft shape in which an inner portion of the rotary shaft 75 is empty, and is capable of transmitting a rotational force of the driving unit 77 to the spin head 71.

The recovery container 50 may be disposed on a circumferential region of the substrate support unit 70. The recovery container 50 has a cylindrical shape in which an upper portion of the recovery container 50 is open, and may provide a process space for performing treatment of the substrate W. The substrate support unit 70 may be positioned in the process space.

The recovery container 50 may include a recovery bucket 51. Contaminants generated in a process of treatment a surface of the substrate W by using a chemical solution may be discharged through the recovery bucket 51 of the recovery container 50. The recovery bucket 51 may be provided with a plurality of recovery buckets 51 disposed in a multi-stage structure so that each chemical solution is recovered separately by distinguishing the type of chemical solution used.

The plurality of recovery buckets 51 disposed in the multi-stage structure may have exhaust ports that communicate with a common annular space.

Specifically, a first to third recovery buckets 51 may include a bottom surface having an annular ring shape and a side wall having a cylindrical shape that extends from the bottom surface. The first to third recovery buckets 51 may respectively provide a first to third recovery spaces into which air current containing treatment solutions and fumes dispersed from the substrate W are introduced. The chemical solution dispersed from the substrate W may be introduced into each recovery space of the first to third recovery buckets 51 and may be discharged to a waste treatment solution unit or a treatment solution recycle unit.

Meanwhile, the recovery container 50 may be coupled to a lifting unit 55 that is configured to change a vertical position of the recovery bucket 51 of the recovery container 50. The lifting unit 55 may rectilinearly move the recovery container 50 in up and down directions. By moving the recovery container 50 up and down through the lifting unit 55, a relative height of the recovery container 50 to the substrate support unit 70 may be changed.

The chemical solution injection means 100 may receive a chemical solution from the chemical solution supply means 90, and may discharge the chemical solution through a nozzle 101 to the substrate W that is seated on the substrate support unit 70.

The chemical solution supply means 90 holds a plurality of chemical solutions, and may supply the chemical solutions for each type to the chemical solution injection means 100 according to a substrate treatment process.

A position of the nozzle 101 of the chemical solution injection means 100 may be changed through a nozzle driving unit 110.

The chemical solution injection means 100 may include the nozzle 101, the nozzle driving unit 110, a chemical solution dispenser 150, and so on.

The nozzle 101 may discharge a chemical solution to the substrate W on the substrate support unit 70.

The chemical solution dispenser 150 may supply the chemical solution to the nozzle 101 while supporting the nozzle 101. The chemical solution dispenser 150 may include a shaft 151, a nozzle arm 153, a chemical solution supply line 160, and so on.

The nozzle 101 is disposed at a first distal end of the nozzle arm 153, so that the nozzle arm 153 is capable of supporting the nozzle 101. A second distal end of the nozzle arm 153 may be connected to the shaft 151.

The shaft 151 may be disposed vertically, and the second distal end of the nozzle arm 153 may be connected to an upper distal end of the shaft 151. The chemical solution supply line 160 may be provided inside the shaft 151 and inside the nozzle arm 153. The chemical solution supply line 160 may supply a chemical solution provided from the chemical solution supply means 90 to the nozzle 101.

The shaft 151 may move the nozzle arm 153 while supporting the nozzle arm 153. For example, by rotating the nozzle arm 153 with respect to the shaft 151 according to a rotation of the shaft 151, a position of the nozzle 101 disposed at a distal end of the nozzle arm 153 is capable of being moved.

For example, as illustrated in FIG. 3, by rotating the nozzle arm 153 or 153' through the shaft 151, the nozzle is capable of being moved to a target position of an upper portion of the substrate W from an initial position where the nozzle 101 is positioned at a home port HP. On the contrary, by rotating the nozzle arm 153 or 153' through the shaft 151, the nozzle is capable of being moved to a target position of the home port HP from an initial position where the nozzle 101 is positioned at the upper portion of the substrate W.

In addition, as the shaft 151 is moved upward or downward, the nozzle arm 153 is moved upward or downward, thereby being capable of moving the position of the nozzle 101 that is disposed at the distal end of the nozzle arm 153.

The shaft 151 may be operated through the nozzle driving unit 110. For example, the nozzle driving unit 110 is connected to a middle end or a distal end of a lower end portion of the shaft 151, and is capable of rotating of lifting the shaft 151.

The nozzle driving unit 110 may include a nozzle driving cylinder 120, a control valve 130, an operation measurement sensor 125, the control unit 200, and so on.

The nozzle driving cylinder 120 may rotate or lift the shaft 151 by performing a reciprocating movement. For example, by injecting and discharging air into the nozzle driving cylinder 120, the reciprocating movement of the nozzle driving cylinder 120 may be repeatedly performed with a stroke distance between a top dead center and a bottom dead center. As an example, by connecting the nozzle driving cylinder 120 and the shaft 151 through a linear gear, a rectilinear movement of the nozzle driving cylinder 120 may be converted into a rotary movement of the shaft 151. In addition, by connecting the shaft 151 to a shaft of the nozzle driving cylinder 120, a lifting movement of the shaft 151 may be performed by performing the rectilinear movement of the nozzle driving cylinder 120.

An air supply means 140 may supply air to the nozzle driving cylinder 120. As an example, the air supply means 140 may include an air pump. The air supply means 140 may provide air pressure that moves the nozzle driving cylinder 120 by supplying air to the nozzle driving cylinder 120.

The control valve 130 may adjust the air pressure for operating the nozzle driving cylinder 120.

In an embodiment, the control valve 130 may include an air pressure valve 131, a proportional control valve 135, and so on.

The air pressure valve 131 may selectively input air supplied to the nozzle driving cylinder 120 from the air supply means 140, and may selectively discharge air from the nozzle driving cylinder 120.

The proportional control valve 135 may adjust an air flow rate input to the nozzle driving cylinder 120. As an example, the proportional control valve 135 may be positioned in the middle of the nozzle driving cylinder 120 and the air pressure valve 131. The proportional control valve 135 may adjust an air flow rate supplied to the nozzle driving cylinder 120 according to an operation of the air pressure valve 131.

The operation measurement sensor 125 may sense an operation of the nozzle driving cylinder 120. The operation measurement sensor 125 may measure an operation time of discharging a chemical solution by sensing an operation of discharging the chemical solution through the nozzle 101.

As an example, the operation measurement sensor 125 is disposed between the nozzle driving cylinder 120 and the shaft 151, so that the movement of the shaft 151 through the nozzle driving cylinder 120 is capable of being sensed. The operation measurement sensor 125 may sense a completion of the operation of the nozzle driving cylinder 120. For example, the operation measurement sensor 125 is provided with a light sensor and so on, and may sense a completion of the movement of the shaft 151 while sensing the movement of the shaft 151 according to the operation of the nozzle driving cylinder 120.

The control unit 200 may control the movement of the nozzle 101 through the nozzle driving unit 110. More specifically, the control unit 200 may adjust the position of the nozzle 101 according to the movement of the shaft 151 by operating the nozzle driving cylinder 120 through a control of the control valve 130.

The control unit 200 may correct the operation of the nozzle driving cylinder 120 to a reference time range by feedback the operation time of the nozzle driving cylinder 120 and by controlling the operation of the control valve 130.

As an example, the control unit 200 may correct the operation of the nozzle driving cylinder 120 to the reference time range by controlling the air flow rate that is input to the nozzle driving cylinder 120 through the proportional control valve 135 of the control valve 130.

As an example of the control unit 200, FIG. 6 illustrates a configuration of an embodiment of the control unit of the nozzle driving unit in the present disclosure.

The control unit 200 may include an operation time determination unit 210, an operation error determination unit 230, an operation correction unit 250, an operation control unit 270, and so on.

The operation time determination unit 210 may determine an operation time of the nozzle driving unit 110.

As an example, the operation time determination unit 210 may determine the operation time of the nozzle driving cylinder 120 on the basis of an input time of an operation signal transmitted to the control valve 130 for an operation of the nozzle driving cylinder 120 and on the basis of an operation completion time of the nozzle driving cylinder 120 measured by the operation measurement sensor 125.

The operation error determination unit 230 may determine an operation error of the identified nozzle driving cylinder 120. As an example, the operation error determination unit 230 may have a reference time for a specific operation of the nozzle driving cylinder 120, and may determine an operation error by comparing a reference time range reflecting a predetermined level of a tolerance value to the reference time and the operation time for the specific operation of the identified nozzle driving cylinder 120. As an example, the operation error determination unit 230 may calculate an operation error range as the operation error time by comparing the reference time range to the operation time of the nozzle driving cylinder 120.

Here, the reference time range may be set in advance on the basis of an operation of the nozzle driving cylinder 120 for moving the nozzle 101 from the initial position of the nozzle 101 to the target position according to a corresponding process condition.

The operation correction unit 250 may correct an operation error of the identified nozzle driving cylinder 120. As an example, when an operation error time of the nozzle driving cylinder 120 is calculated, the operation correction unit 250 may determine a correction value for the air input flow rate of the nozzle driving cylinder 120 on the basis of the operation error time so as to correct the operation error of the nozzle driving cylinder 120.

For example, when the operation time of the identified nozzle driving cylinder 120 is an operation error time that is slower than the reference time range, the operation correction unit 250 may further increase the air input flow rate input to the nozzle driving cylinder 120 so that the operation of the nozzle driving cylinder 120 is performed quickly by the operation error time. Conversely, when the operation time of the identified nozzle driving cylinder 120 is an operation error time that is faster than the reference time range, the operation correction unit 250 may further decrease the air input flow rate input to the nozzle driving cylinder 120 so that the operation of the nozzle driving cylinder 120 is performed slowly by the operation error time.

The operation control unit 270 may change the position of the nozzle 101 according to the movement of the shaft 151 by operating the nozzle driving cylinder 120.

More specifically, the operation control unit 270 may operate the nozzle driving cylinder 120 by controlling the control valve 130.

Furthermore, when the operation error determination unit 230 set a correction value according to the operation error of the nozzle driving cylinder 120, the operation control unit 270 may correct the operation of the nozzle driving cylinder 120 by controlling the control valve 130 by reflecting the correction value.

As an example, the operation control unit 270 may adjust the proportional control valve 135 of the control valve 130 on the basis of the correction value so that the air input flow rate input to the nozzle driving cylinder 120 is adjusted, thereby being capable of correcting the operation of the nozzle driving cylinder 120.

As an example, the operation of the nozzle driving cylinder 120 may be set in advance in response to a specific position movement of the nozzle 101. At this time, an operation signal for the control valve 130 corresponding to an air input setting value and an air output setting value for the nozzle driving cylinder 120 may be set. The operation control unit 270 may correct and set an operation signal of the proportional control valve 135 on the basis of a corrected air input flow rate setting value for the nozzle driving cylinder 120.

Figure 7:
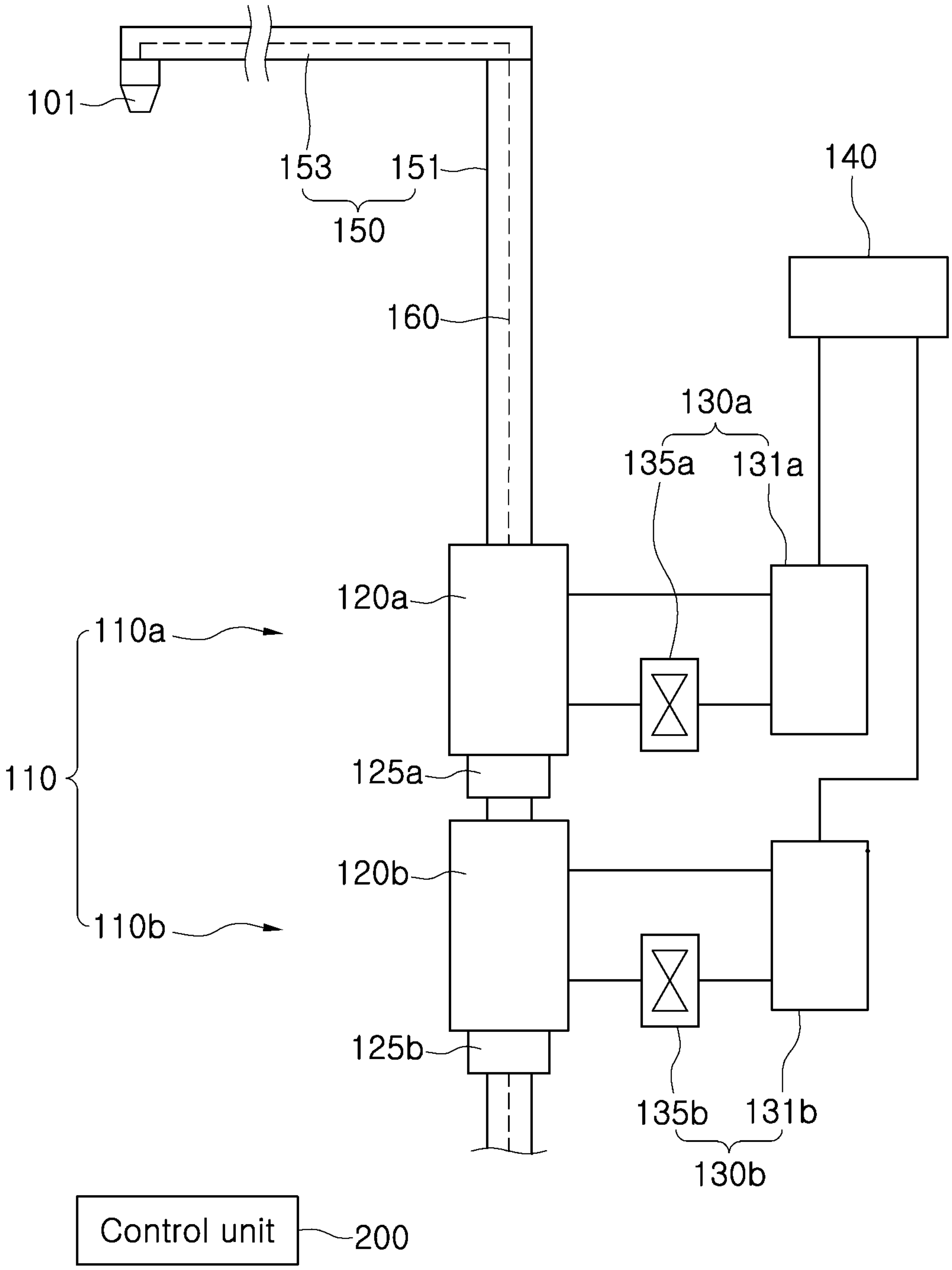
FIG. 7 is a view illustrating another embodiment of the chemical solution injection means of the substrate treatment apparatus according to the present disclosure.
Figure 8:
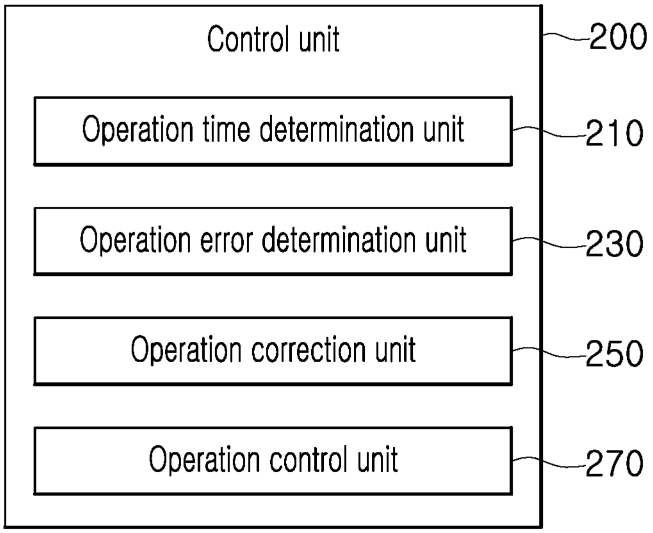
FIG. 8 is a view illustrating a configuration of another embodiment of the chemical solution injection means of the substrate treatment apparatus according to the present disclosure.

FIG. 7 is a view illustrating another embodiment of the chemical solution injection means of the substrate treatment apparatus according to the present disclosure, and FIG. 8 is a view illustrating a configuration of another embodiment of the chemical solution injection means of the substrate treatment apparatus according to the present disclosure.

In describing the embodiment, descriptions of parts that overlap with the previously described embodiment will be briefly described or will be omitted.

The nozzle driving unit 110 may include a rotation driving unit 110*a* and a lift driving unit 110*b*.

The rotation driving unit 110*a* may change the position of the nozzle 101 by rotating the shaft 151. For example, the rotation driving unit 110*a* may change a chemical solution discharge position by rotating the nozzle 101 in a horizontal direction on the substrate, or may change the position of the nozzle 101 between the substrate and the home port.

The rotation driving unit 110*a* may include a rotation driving cylinder 120*a*, a first control valve 130*a*, a first operation measurement sensor 125*a*, and so on.

The rotation driving cylinder 120*a* may rotate the shaft 151. Since the shaft 151 is rotated by an operation of the rotation driving cylinder 120*a*, the nozzle arm 153 is rotated with respect to the shaft 151, so that the position of the nozzle 101 in the horizontal direction is capable of being changed.

The first control valve 130*a* may include a first air pressure valve 131*a* and a first proportional control valve 135*a*.

The first air pressure valve 131*a* may selectively input air supplied to the rotation driving cylinder 120*a* from the air supply means 140, and may selectively discharge air from the rotation driving cylinder 120*a*.

The first proportional control valve 135*a* may adjust an air flow rate input to the rotation driving cylinder 120*a*. By adjusting the air input flow rate of the rotation driving cylinder 120*a* through the first proportional control valve 135*a*, a rotation operation of the shaft 151 is capable of being controlled.

The first operation measurement sensor 125*a* may measure an operation of the rotation driving cylinder 120*a*. For example, the first operation measurement sensor 125*a* may sense the completion of the operation of the rotation driving cylinder 120*a*, and may determine a movement speed and a movement amount of the nozzle 101 in the horizontal direction.

The lift driving unit 110*b* may change a position of the nozzle 101 by lifting the shaft 151. For example, when the lift driving unit 110*b* moves the nozzle 101 in the vertical direction, the position of the nozzle 101 on the upper portion of the substrate or on the home port is capable of being changed.

The lift driving unit 110*b* may include a lift driving cylinder 120*b*, a second control valve 130*b*, a second operation measurement sensor 125*b*, and so on.

The lift driving cylinder 120*b* may lift the shaft 151. Since the shaft 151 is lifted upward or downward by an operation of the lift driving cylinder 120*b*, the nozzle arm 153 is lifted upward or downward, thereby being capable of changing the position of the nozzle 101 in the vertical direction.

The second control valve 130*b* may include a second air pressure valve 131*b* and a second proportional control valve 135*b*.

The second air pressure valve 131*b* may selectively input air supplied to the lift driving cylinder 120*b* from the air supply means 140, and may selectively discharge air from the lift driving cylinder 120*b*.

The second proportional control valve 135*b* may adjust an air flow rate input to the lift driving cylinder 120*b*. By adjusting the air input flow rate of the lift driving cylinder 120*b* through the second proportional control valve 135*b*, a lifting operation of the shaft 151 is capable of being controlled.

The second operation measurement sensor 125*b* may measure an operation of the lift driving cylinder 120*b*. For example, the second operation measurement sensor 125*b* may sense the completion of the operation of the lift driving cylinder 120*b*, and may determine a movement speed and a movement amount of the nozzle 101 in the vertical direction.

As such, in the present disclosure, the nozzle driving unit 110 includes the rotation driving unit 110*a* and the lift driving unit 110*b*, so that a horizontal direction movement and a vertical direction movement of the nozzle 101 are capable of being more precisely controlled.

In addition, in the present disclosure, a substrate treatment method using the substrate treatment apparatus according to the present disclosure described above is proposed. Hereinafter, a substrate treatment method according to the present disclosure will be described with reference to an embodiment.

Since the substrate treatment method according to the present disclosure is implemented through an embodiment of the substrate treatment apparatus described above, an embodiment of the substrate treatment apparatus will be referred to together.

Figure 9:
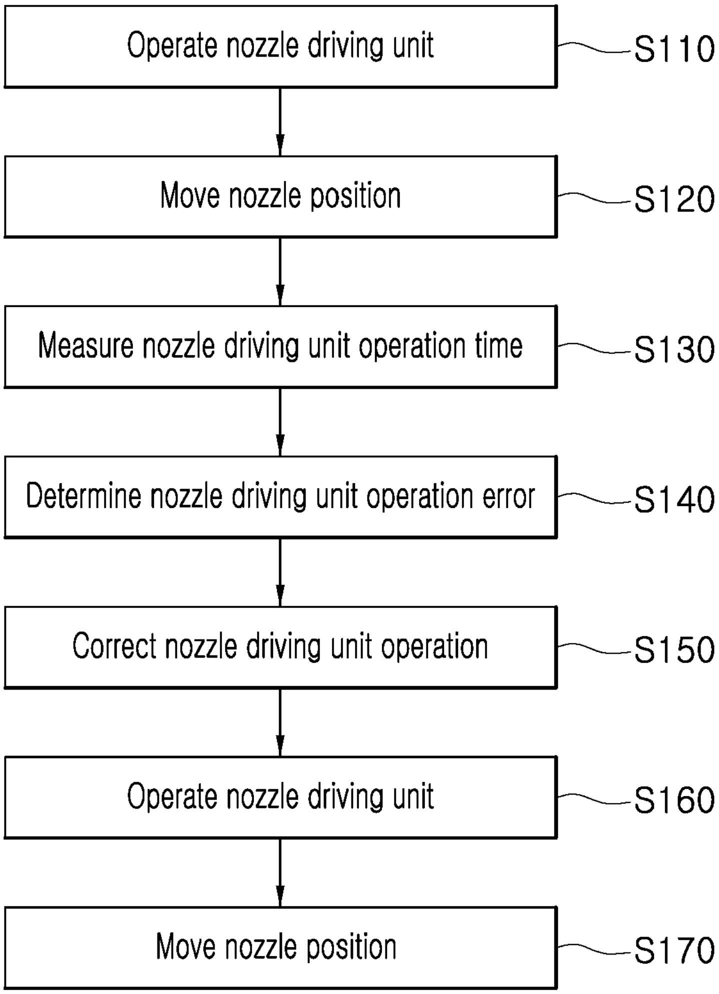
FIG. 9 is a flowchart illustrating an embodiment of a substrate treatment method according to the present disclosure.

FIG. 9 is a flowchart illustrating an embodiment of a substrate treatment method according to the present disclosure.

A position of the nozzle 101 is capable of being changed by moving the shaft 151 according to an operation S110 of the nozzle driving unit 110.

The control unit 200 may operate the nozzle driving unit 110 by controlling an operation signal of the nozzle driving unit 110. As an example, in response to a specific position movement of the nozzle 101, an air input flow rate and an air discharge flow rate that are input and discharged to the nozzle driving cylinder 120 through the control valve 130 are set in the control unit 200. The control unit 200 may operate the nozzle driving cylinder 120 by transmitting an operation signal for the control valve 130 on the basis of the air input flow rate and the air discharge flow rate.

The shaft 151 is moved through the operation of the nozzle driving cylinder 120, the nozzle 101 is capable of being moved from the initial position to the target position S120.

Figure 10:
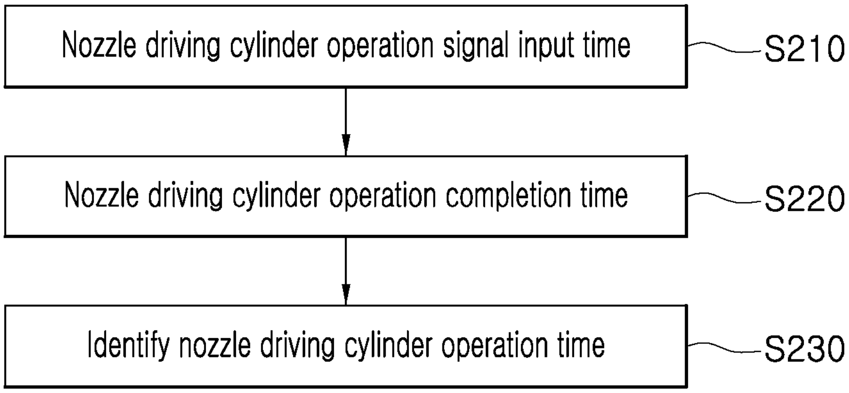
FIG. 10 is a flowchart illustrating an embodiment of measuring an operation time of a nozzle driving cylinder in the substrate treatment method according to the present disclosure.

By moving the nozzle 101 through the operation of the nozzle driving cylinder 120, an operation time of the nozzle driving cylinder 120 is capable of being measured S130.

in relation to a process of identifying the operation time of the nozzle driving cylinder 120, FIG. 10 illustrates a flowchart illustrating an embodiment of measuring the operation time of the nozzle driving cylinder in the substrate treatment method according to the present disclosure.

The control unit 200 may operate the nozzle driving cylinder 120 by transmitting the operation signal to the control valve 130 for operating the nozzle driving cylinder 120. At this time, the control unit 200 may identify an input time of an operation signal transmitted to the control valve 130 for the operation of the nozzle driving cylinder 120 as an operation start time of the nozzle driving cylinder 120 S210.

In addition, the operation measurement sensor 125 may sense the completion of the movement of the shaft 151 through the nozzle driving cylinder 120, so that the control unit 200 may identify the completion time of the operation of the nozzle driving cylinder 120 S220.

The control unit 200 may determine the operation time of the nozzle driving cylinder 120 on the basis of the input time of the operation signal transmitted to the control valve 130 for the operation of the nozzle driving cylinder 120 and on the basis of the completion time of the nozzle driving cylinder 120 measured through the operation measurement sensor 125 S230.

Furthermore, in the present disclosure, the rotation driving unit 110*a* configured to change the position of the nozzle 101 in the horizontal direction and the lift driving unit 110*b* configured to change the position of the nozzle 101 in the vertical direction may be included, and the rotation driving unit 110*a* and the lift driving unit 110*b* will be described with reference to an embodiment and a process of identifying operation times of the rotation driving unit 110*a* and the lift driving unit 110*b*.

Figure 11:
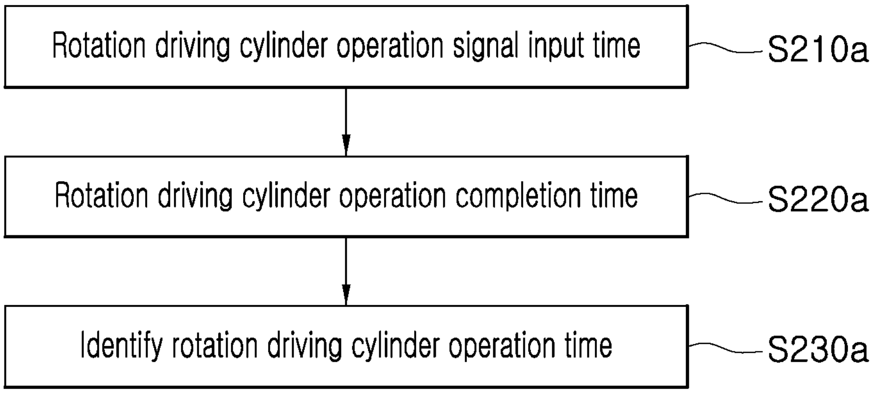
FIG. 11 is a flowchart illustrating an embodiment of measuring an operation time of a rotation driving cylinder in the substrate treatment method according to the present disclosure.
Figure 12:
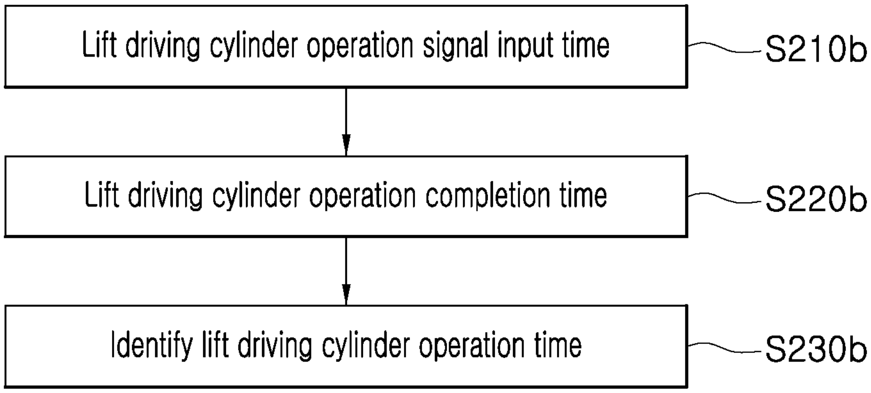
FIG. 12 is a flowchart illustrating an embodiment of measuring an operation time of a lift driving cylinder in the substrate treatment method according to the present disclosure.

FIG. 11 is a flowchart illustrating an embodiment of measuring an operation time of a rotation driving cylinder in the substrate treatment method according to the present disclosure, and FIG. 12 is a flowchart illustrating an embodiment of measuring an operation time of a lift driving cylinder in the substrate treatment method according to the present disclosure.

The position of the nozzle 101 in the horizontal direction is capable of being changed by rotating the shaft 151 in the horizontal direction through an operation of the rotation driving unit 110*a*. In addition, the position of the nozzle 101 in the vertical direction is capable of being changed by lifting the shaft 151 in the vertical direction through an operation of the lift driving unit 110*b*.

The control unit 200 may operate the rotation driving cylinder 120*a* by transmitting an operation signal to the first control valve 130*a* for the operation of the rotation driving cylinder 120*a*. In addition, the control unit 200 may operate the lift driving cylinder 120*b* by transmitting an operation signal to the second control valve 130*b* for the operation of the lift driving cylinder 120*b*. At this time, the control unit 200 may identify an input time of an operation signal transmitted to the first control valve 130*a* or the second control valve 130*b* for the operation of the rotation driving cylinder 120*a* or the lift driving cylinder 120*b* as an operation start time of the rotation driving cylinder 120*a* or the lift driving cylinder 120*b* S210*a* or S210*b*.

The first operation measurement sensor 125*a* may detect the completion of the rotation movement of the shaft 151 through the rotation driving cylinder 120*a*. In addition, the second operation measurement sensor 125*b* may detect the completion of the lift movement of the shaft 151 through the lift driving cylinder 120*b*. Through this, the control unit 200 may determine a completion time of the operation of the rotation driving cylinder 120*a* or the lift driving cylinder 120*b* S220*a* or S220*b*.

The control unit 200 may determine an operation time of the rotation driving cylinder 120*a* or the lift driving cylinder 120*b* on the basis of the input time of the operation signal transmitted to the first control valve 130*a* or the second control valve 130*b* and on the basis of the completion time of the operation of the rotation driving cylinder 120*a* or the lift driving cylinder 120*b* measured through the first operation measurement sensor 125*a* or the second operation measurement sensor 125*b* S230*a* or S230*b*.

Next, the control unit 200 may determine an operation error of the nozzle driving cylinder 120 by comparing the operation time of the identified nozzle driving cylinder 120 to the reference time range S140.

As an example, the operation of the nozzle driving cylinder 120 for moving the nozzle 101 from the initial position to the target position according to the corresponding process condition may be set in advance. The nozzle driving cylinder 120 may be operated according to air input and air discharge, and an air input flow rate and an air discharge flow rate for the nozzle driving cylinder 120 may be set in response to the position movement of the nozzle 101. The control unit 200 may adjust the operation of the nozzle driving cylinder 120 by controlling the control valve 130 on the basis of the air input flow rate setting value and the air discharge flow setting value.

Even if the operation of the nozzle driving cylinder 120 is controlled according to the setting values, an eccentric load may occur due to a repeated operation of the nozzle driving cylinder 120, and an error in the operation time may occur due to a decrease in lubrication. Due to such an operation error of the nozzle driving cylinder 120, a movement speed and a movement amount of the nozzle 101 may be changed. As a result, a UPH may be reduced due to a delay in a process time. Furthermore, a problem in which a yield is reduced due to occurrence of a defective product.

Figure 13:
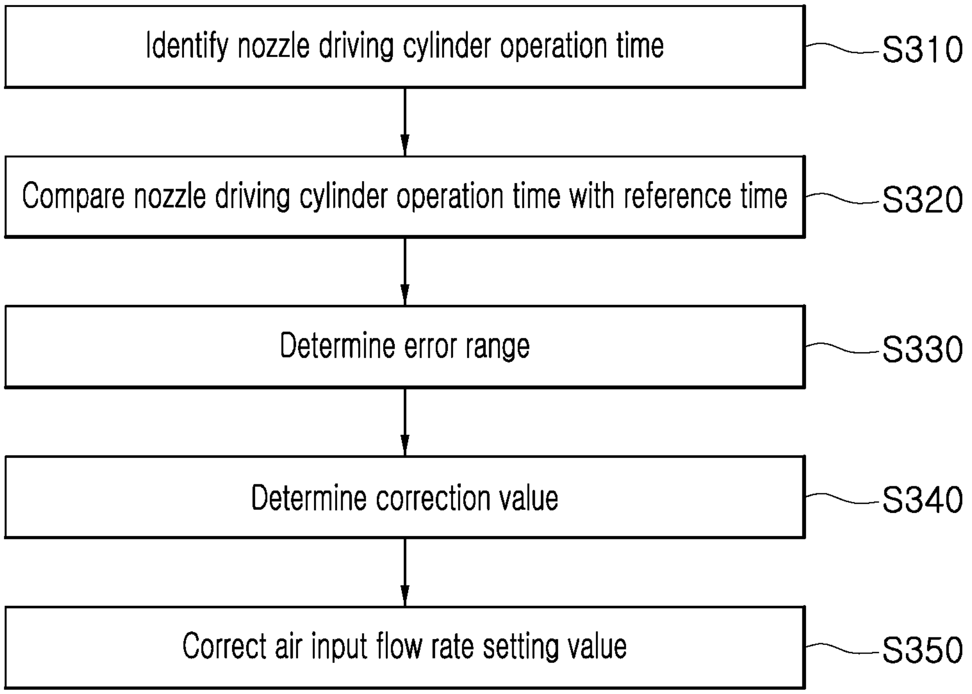
FIG. 13 is a flowchart illustrating an embodiment of correcting an operation of the nozzle driving cylinder in the substrate treatment method according to the present disclosure.

The control unit 200 may correct the operation of the nozzle driving unit 120 S150 by determining an operation error S140 on the basis of an operation time of the nozzle driving cylinder 120.

in relation to a process of correcting the operation of the nozzle driving cylinder 120, FIG. 13 illustrates a flowchart illustrating an embodiment of correcting the operation of the nozzle driving cylinder in the substrate treatment method according to the present disclosure.

The control unit 200 may identify the operation time of the nozzle driving cylinder 120 described above S310, and may compare the operation time of the nozzle driving cylinder 120 to the reference time range set according to the movement of the nozzle 101 according to the process condition S320.

The control unit 200 may determine whether an operation error of the nozzle driving cylinder 120 occurs by comparing the operation time of the nozzle driving cylinder 120 with the reference time range.

When an error occurs in the operation of the nozzle driving cylinder 120, the control unit 200 may determine an operation error range of the nozzle driving cylinder 120 S330. For example, a difference value between the operation time of the nozzle driving cylinder 120 and the reference time range may be an error range. Here, the error range may be calculated as an error time.

The control unit 200 may determine a correction value of the air input flow rate supplied to the nozzle driving cylinder 120 on the basis of an operation time error of the nozzle driving cylinder 120 S340.

For example, when the operation time of the nozzle driving cylinder 120 is an operation error time that is slower than the reference time range, the control unit 200 may further increase the air flow rate that is input to the nozzle driving cylinder 120 so that the operation of the nozzle driving cylinder 120 is performed quickly by the operation error time. Conversely, when the operation error time is an operation error time that is faster than the reference time range, the control unit 200 may set a correction value for the air input flow rate by further reducing the air flow rate input to the nozzle driving cylinder 120 so that the operation of the nozzle driving cylinder 120 is performed slowly by the operation error time.

The control unit 200 may correct the air input flow rate setting value for the nozzle driving cylinder 120 on the basis of the correction value for the air input flow rate S350.

In an embodiment, the control unit 200 may set an operation signal of the proportional control valve 135 of the control valve 130 on the basis of a corrected air input flow rate setting value for the nozzle driving cylinder 120. As described above, since the air flow rate input to the nozzle driving cylinder 120 is capable of being adjusted through the proportional control valve 135, the control unit 200 is capable of adjusting the air input flow rate for the nozzle driving cylinder 120 by adjusting the operation signal for the proportional control valve 135.

As an example, in the present disclosure, a process of correcting each operation of the rotation driving cylinder 120*a* of the rotation driving unit 110*a* and the lift driving cylinder 120*b* of the lift driving unit 110*b* will be described with reference to an embodiment.

Figure 14:
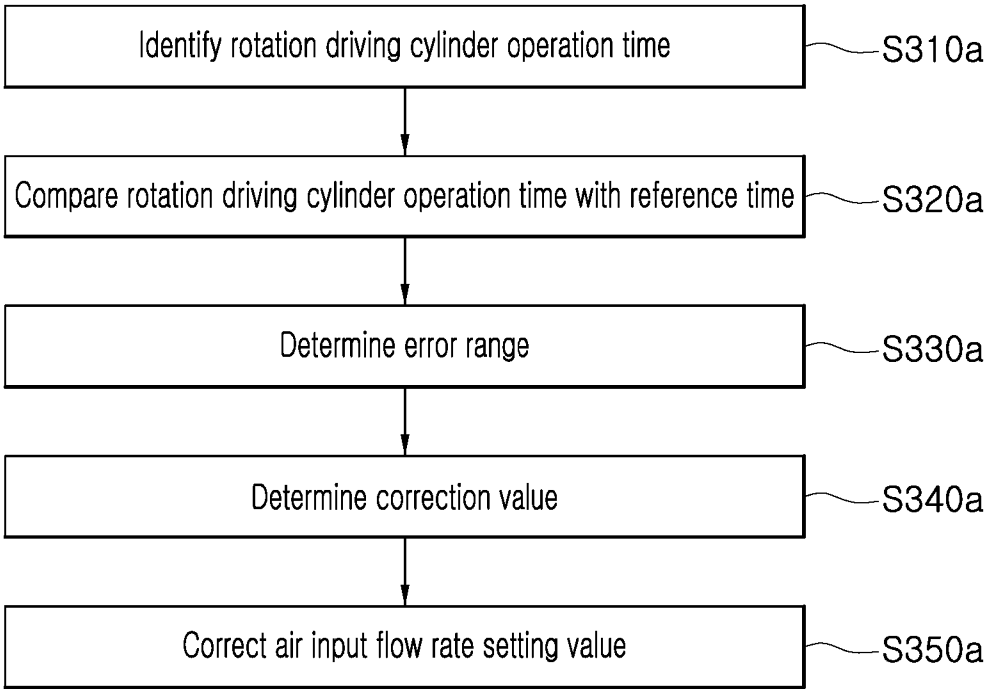
FIG. 14 is a flowchart illustrating an embodiment of correcting an operation of the rotation driving cylinder in the substrate treatment method according to the present disclosure.
Figure 15:
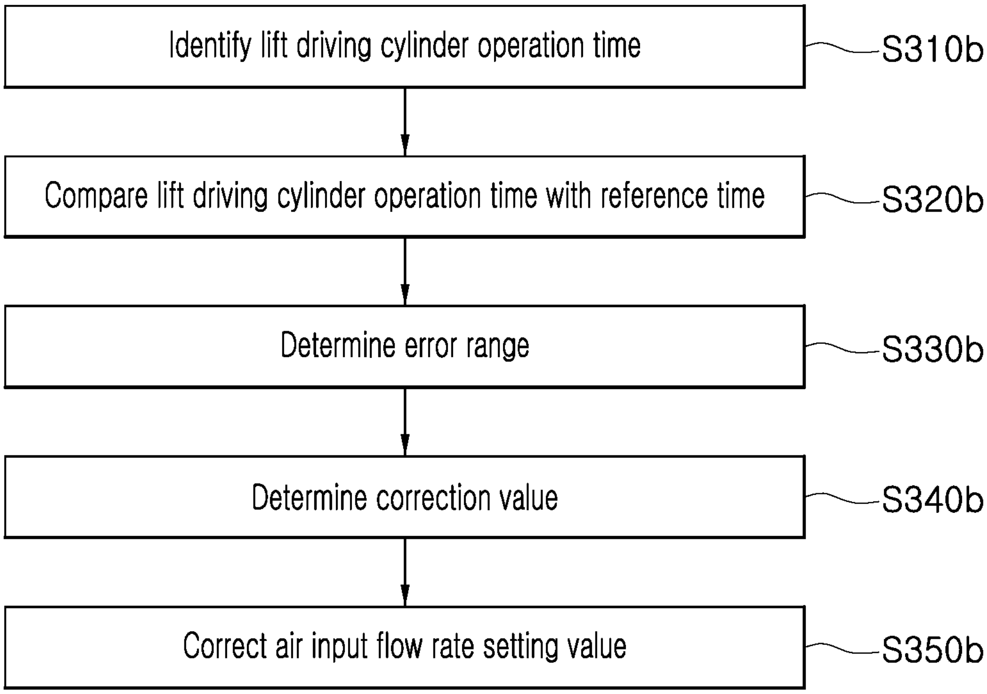
FIG. 15 is a flowchart illustrating an embodiment of correcting an operation of the lift driving cylinder in the substrate treatment method according to the present disclosure.

FIG. 14 is a flowchart illustrating an embodiment of correcting an operation of the rotation driving cylinder in the substrate treatment method according to the present disclosure, and FIG. 15 is a flowchart illustrating an embodiment of correcting an operation of the lift driving cylinder in the substrate treatment method according to the present disclosure.

The control unit 200 may determine an operation time of the rotation driving cylinder 120*a* or an operation time of the lift driving cylinder 120*b* S310*a* or S310*b*. In addition, the control unit 200 may compare a horizontal movement reference time range set according to the horizontal movement of the nozzle 101 according to the corresponding process condition with the operation time of the rotation driving cylinder 120*a* S320*a*. In addition, the control unit 200 may compare a vertical movement reference time range set according to the vertical movement of the nozzle 101 according to the corresponding process condition with the operation time of the lift driving cylinder 120*b* S320*b*.

The control unit 200 may determine whether an operation error of the rotation driving cylinder 120*a* occurs by comparing the operation time of the rotation driving cylinder 120*a* with the reference time range. In addition, the control unit 200 may determine whether an operation error of the lift driving cylinder 120*b* occurs by comparing the operation time of the lift driving cylinder 120*b* with the reference time range.

When an error occurs in the operation of the rotation driving cylinder 120*a* or in the operation of the lift driving cylinder 120*b*, the control unit 200 may determine an operation error range of the rotation driving cylinder 120*a* or an operation error range of the lift driving cylinder 120*b* S330*a* or S330*b*. As an example, an error range of the rotation driving cylinder 120*a* or an error range of the lift driving cylinder 120*b* may be calculated as an error time.

The control unit 200 may determine a correction value of the air input flow rate supplied to the rotation driving cylinder 120*a* on the basis of an operation time error of the rotation driving cylinder 120*a* S340*a*. In addition, the control unit 200 may determine a correction value of the air input flow rate supplied to the lift driving cylinder 120*b* on the basis of an operation time error of the lift driving cylinder 120*b* S340*b*.

The control unit 200 may correct an air input flow rate setting value for the rotation driving cylinder 120*a* or for the lift driving cylinder 120*b* on the basis of the correction value for the air input flow rate S350*a* or S350*b*.

In an embodiment, the control unit 200 may set an operation signal of the first proportional control valve 135*a* of the first control valve 130*a* on the basis of a corrected air input flow rate setting value for the rotation driving cylinder 120*a*. In addition, the control unit 200 may set an operation signal of the second proportional control valve 135*b* of the second control valve 130*b* on the basis of a corrected air input setting value for the lift driving cylinder 120*b*.

Through the process described above, the operation of the nozzle driving cylinder 120 is corrected to the reference time range, so that the nozzle 101 is capable of being moved with an accurate movement speed and an accurate movement amount by moving the nozzle driving unit 110 S170. As an example, the control unit 200 may adjust the operation of the nozzle driving cylinder 120 by applying an operation signal to the control valve 130 on the basis of a corrected air input flow rate setting value, thereby being capable of moving the nozzle 101 according to the reference time range.

As described above, in the present disclosure, a deviation of a nozzle movement between facilities may be reduced by correcting an air input flow rate of the nozzle driving cylinder on the basis of an operation time of the nozzle driving cylinder by feedback a repetitive operation of the nozzle driving cylinder.

Particularly, the operation time of the rotation driving cylinder and the operation time of the vertical driving cylinder of the nozzle driving unit are maintained to a predetermined level, so that the accuracy of the movement speed and the movement position of the nozzle may be increased.

Although the embodiments of the present disclosure have been disclosed for illustrative purposes, those skilled in the art will appreciate that various modifications, additions, and substitutions are possible, without departing from the scope and spirit of the present disclosure. Accordingly, embodiments disclosed in the present disclosure are provided for describing the present disclosure and are not intended to limit the technical ideas of the present disclosure. The technical ideas of the present disclosure are not limited to the embodiments. The scope of the present disclosure should be construed as being covered by the scope of the appended claims, and all technical ideas falling within the scope of the claims should be construed as being included in the scope of the present disclosure.

What is claimed is:

1. A substrate treatment apparatus comprising:
- a nozzle configured to discharge a chemical solution to a substrate;
- a chemical solution dispenser configured to supply the chemical solution to the nozzle while supporting the nozzle; and
- a nozzle driving unit comprising:
  - a nozzle driving cylinder configured to move the nozzle;
  - a control valve configured to adjust air pressure for operating the nozzle driving cylinder;
  - an operation measurement sensor configured to measure an operation time of the nozzle driving cylinder, the operation time being defined as a time interval between initiation and completion of the nozzle's movement by the nozzle driving unit;
  - an air supply means configured to provide air to the control valve; and
  - a control unit configured to:
    - receive the operation time of the nozzle driving cylinder; and
    - control the operation time of the nozzle driving cylinder to be within a predetermined reference time range based on the measured operation time of the nozzle driving cylinder by adjusting an air flow rate of an air flow which is input to the nozzle driving cylinder.

2. The substrate treatment apparatus of claim 1, wherein the control valve comprises:
- an air pressure valve configured to control an air input and an air discharge of the nozzle driving cylinder; and a proportional control valve configured to adjust the air flow rate of the air flow which is input to the nozzle driving cylinder.

3. The substrate treatment apparatus of claim 2, wherein the proportional control valve is disposed at a middle end between the nozzle driving cylinder and the air pressure valve, and is configured to adjust the air flow rate of the air flow which is input to the nozzle driving cylinder from the air pressure valve.

4. The substrate treatment apparatus of claim 2, wherein the control unit is configured further to: control the air flow rate through the proportional control valve of the control valve to adjust the operation time of the nozzle driving cylinder to be in the predetermined reference time range.

5. The substrate treatment apparatus of claim 4, wherein the control unit is configured further to:

determine an error range by comparing the measured operation time of the nozzle driving cylinder with the predetermined reference time range, and control the operation time of the nozzle driving cylinder to be in the predetermined reference time range by controlling, on the basis of the error range, the air flow rate of the air flow which is input to the nozzle driving cylinder through the proportional control valve of the control valve.

6. The substrate treatment apparatus of claim 1, wherein the operation measurement sensor is configured to measure a completion time of the operation of the nozzle driving cylinder, and wherein the control unit is configured to identify the operation time of the nozzle driving cylinder on the basis of an input time of an operation signal transmitted to the control valve for the operation of the nozzle driving cylinder and the completion time of the operation of the nozzle driving cylinder.

7. The substrate treatment apparatus of claim 1, wherein the control unit further comprises:

an operation time determination unit configured to determine the operation time of the nozzle driving cylinder;

an operation error determination unit configured to determine an operation time error of the nozzle driving cylinder on the basis of the predetermined reference time range;

an operation correction unit configured to set a correction value for the operation time error of the nozzle driving cylinder; and an operation control unit configured to control the operation of the nozzle driving cylinder, the operation control unit being configured to control the operation time of the nozzle driving cylinder to the predetermined reference time range on the basis of the correction value.

8. The substrate treatment apparatus of claim 1, wherein the chemical solution dispenser comprises:

a nozzle arm supporting the nozzle by having a distal end thereof connected to the nozzle;

a shaft supporting the nozzle arm by being connected to the nozzle arm; and a chemical solution supply line disposed inside the nozzle arm and inside the shaft, the chemical solution supply line being configured to supply the chemical solution to the nozzle.

9. The substrate treatment apparatus of claim 8, wherein the nozzle driving cylinder of the nozzle driving unit is configured to change a position of the nozzle by moving the shaft.

10. The substrate treatment apparatus of claim 9, wherein the nozzle driving cylinder comprises a rotation driving cylinder that is configured to rotate the shaft, wherein the control valve comprises:

a first air pressure valve configured to control an air input and an air discharge of the rotation driving cylinder; and a first proportional control valve configured to adjust an air flow rate of an air flow which is input to the rotation driving cylinder, wherein the operation measurement sensor comprises a first operation measurement sensor configured to measure an operation of the rotation driving cylinder, and wherein the control unit is configured to receive an operation time of the rotation driving cylinder and to control an operation of the first proportional control valve, thereby controlling the operation time of the rotation driving cylinder to be in the predetermined reference time range.

11. The substrate treatment apparatus of claim 9, wherein the nozzle driving cylinder comprises a lift driving cylinder that is configured to lift the shaft, wherein the control valve comprises:

a second air pressure valve configured to control an air input and an air discharge of the lift driving cylinder; and a second proportional control valve configured to adjust an air flow rate of an air flow which is input to the lift driving cylinder, wherein the operation measurement sensor comprises a second operation measurement sensor configured to measure an operation of the lift driving cylinder, and wherein the control unit is configured to receive the operation time of the lift driving cylinder and to control an operation of the second proportional control valve, thereby controlling the operation time of the lift driving cylinder to be in the predetermined reference time range.

12. The substrate treatment apparatus of claim 1, further comprising:

a chamber providing a substrate treatment space; and a substrate support unit disposed at a lower portion of the substrate treatment space and configured to support the substrate.

13. A substrate treatment apparatus comprising:

a substrate support unit supporting a substrate;

a nozzle configured to discharge a chemical solution to the substrate;

a dispenser comprising:

a nozzle arm that supports the nozzle by having a distal end thereof connected to the nozzle, a shaft supporting the nozzle arm by being connected to the nozzle arm, and a chemical solution supply line which is disposed inside the nozzle arm and inside the shaft and which is configured to supply the chemical solution to the nozzle; and a nozzle driving unit comprising a nozzle driving cylinder that is configured to change a position of the nozzle by moving the shaft, a control valve provided with an air pressure valve configured to control an air input and an air discharge of the nozzle driving cylinder and with a proportional control valve configured to adjust an air flow rate of an air flow which is input to the nozzle driving cylinder, an operation measurement sensor configured to measure an operation of the nozzle driving cylinder, an air supply means configured to supply air to the control valve, and a control unit which is configured to:

measure an operation time of the nozzle driving cylinder, the operation time being defined as a time interval between initiation and completion of the nozzle's movement by the nozzle driving unit, and control the operation time of the nozzle driving cylinder to be within a predetermined reference time range based on the measured operation time of the nozzle driving cylinder by adjusting an air flow rate of an air flow which is input to the nozzle driving cylinder.

* * * * *